(12) United States Patent
Katsuta

(10) Patent No.: US 10,086,790 B2
(45) Date of Patent: Oct. 2, 2018

(54) GAS GENERATOR AND ASSEMBLING METHOD THEREFOR

(71) Applicant: DAICEL CORPORATION, Osaka-shi, Osaka (JP)

(72) Inventor: Takashi Katsuta, Tatsuno (JP)

(73) Assignee: DAICEL CORPORATION, Osaka (JP)

( * ) Notice: Subject to any disclaimer, the term of this patent is extended or adjusted under 35 U.S.C. 154(b) by 24 days.

(21) Appl. No.: 15/302,623

(22) PCT Filed: Apr. 3, 2015

(86) PCT No.: PCT/JP2015/060558
§ 371 (c)(1),
(2) Date: Oct. 7, 2016

(87) PCT Pub. No.: WO2015/170537
PCT Pub. Date: Nov. 12, 2015

(65) Prior Publication Data
US 2017/0028963 A1 Feb. 2, 2017

(30) Foreign Application Priority Data
May 9, 2014 (JP) .................................. 2014-097275

(51) Int. Cl.
*B60R 21/26* (2011.01)
*B60R 21/264* (2006.01)

(52) U.S. Cl.
CPC .. *B60R 21/264* (2013.01); *B60R 2021/26029* (2013.01); *B60R 2021/26076* (2013.01); *B60R 2021/26094* (2013.01)

(58) Field of Classification Search
CPC ........ B60R 21/264; B60R 2021/26094; B60R 2021/26029; B60R 2021/26076
See application file for complete search history.

(56) References Cited

U.S. PATENT DOCUMENTS 6,328,337 B1   12/2001  Katsuda et al.
6,540,256 B2   4/2003   Iwai et al.
(Continued)

FOREIGN PATENT DOCUMENTS

CN   101041345 A   9/2007
CN   100581881 C   1/2010
(Continued)

OTHER PUBLICATIONS

Oji et al., Gas Generator for Air Bag, Jul. 9, 2003, JPO, JP 2003-191816 A, English Abstract (Year: 2003).*
(Continued)

*Primary Examiner* — James A English
(74) *Attorney, Agent, or Firm* — Birch, Stewart, Kolasch & Birch, LLP

(57) ABSTRACT

The present invention provides a gas generator in which no positioning device for a cylindrical filter is needed, and a method of assembling the gas generator.
The inside of a combustion chamber is filled with a predetermined amount of a molded article of a gas generating agent in a state in which an outside positioning jig is disposed between a cylindrical filter and a circumferential wall portion of a diffuser shell, and an inside positioning jig is disposed between the cylindrical filter and an inner tube. Upon completion of the filling, the two positioning jigs are removed, and the molded article of the gas generating agent is pressed in by an annular underplate. The cylindrical filter is positioned by this pressing-in.

2 Claims, 3 Drawing Sheets

(56) References Cited

U.S. PATENT DOCUMENTS

| | | | |
|---|---|---|---|
| 2005/0151356 A1* | 7/2005 | Ohji | B60R 21/2644 |
| | | | 280/741 |
| 2006/0151977 A1* | 7/2006 | Yamazaki | B60R 21/2644 |
| | | | 280/736 |
| 2007/0222195 A1 | 9/2007 | Yabuta et al. | |
| 2008/0118408 A1 | 5/2008 | Numoto et al. | |
| 2012/0024186 A1 | 2/2012 | Mitsunabe et al. | |
| 2012/0090493 A1* | 4/2012 | Fukuyama | B60R 21/261 |
| | | | 102/530 |
| 2015/0225308 A1* | 8/2015 | Fujisaki | B60R 21/2644 |
| | | | 280/740 |
| 2016/0121841 A1* | 5/2016 | Katsuta | B60R 21/2644 |
| | | | 102/530 |

FOREIGN PATENT DOCUMENTS

| | | | | |
|---|---|---|---|---|
| JP | 10-138863 A | | 5/1998 | |
| JP | 11-59317 A | | 3/1999 | |
| JP | 11-334517 A | | 12/1999 | |
| JP | 2003191816 A | * | 7/2003 | ......... B60R 21/2644 |
| JP | 2005-186873 A | | 7/2005 | |
| JP | 2008-114773 A | | 5/2008 | |

OTHER PUBLICATIONS

Oji et al., Gas Generator for Air Bag, Jul. 9, 2003, JPO, JP 2003-191816 A, Machine Translation of Description (Year: 2003).*

Yukimoto et al., Filter for Inflator of Airbag Device, Jul. 14, 2005, JPO, JP 2005-186873 A, Machine Translation of Description (Year: 2005).*

* cited by examiner

[Fig. 1]
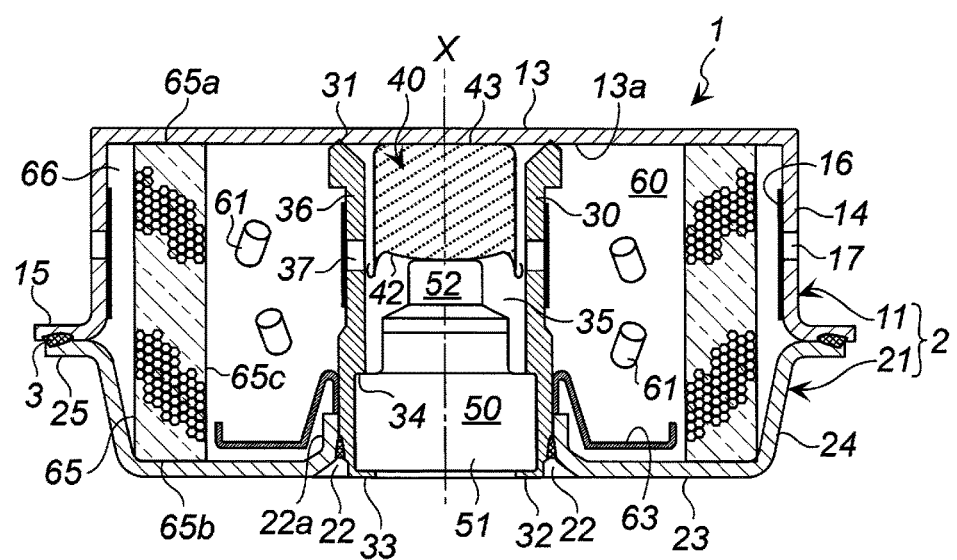

[Fig. 2]
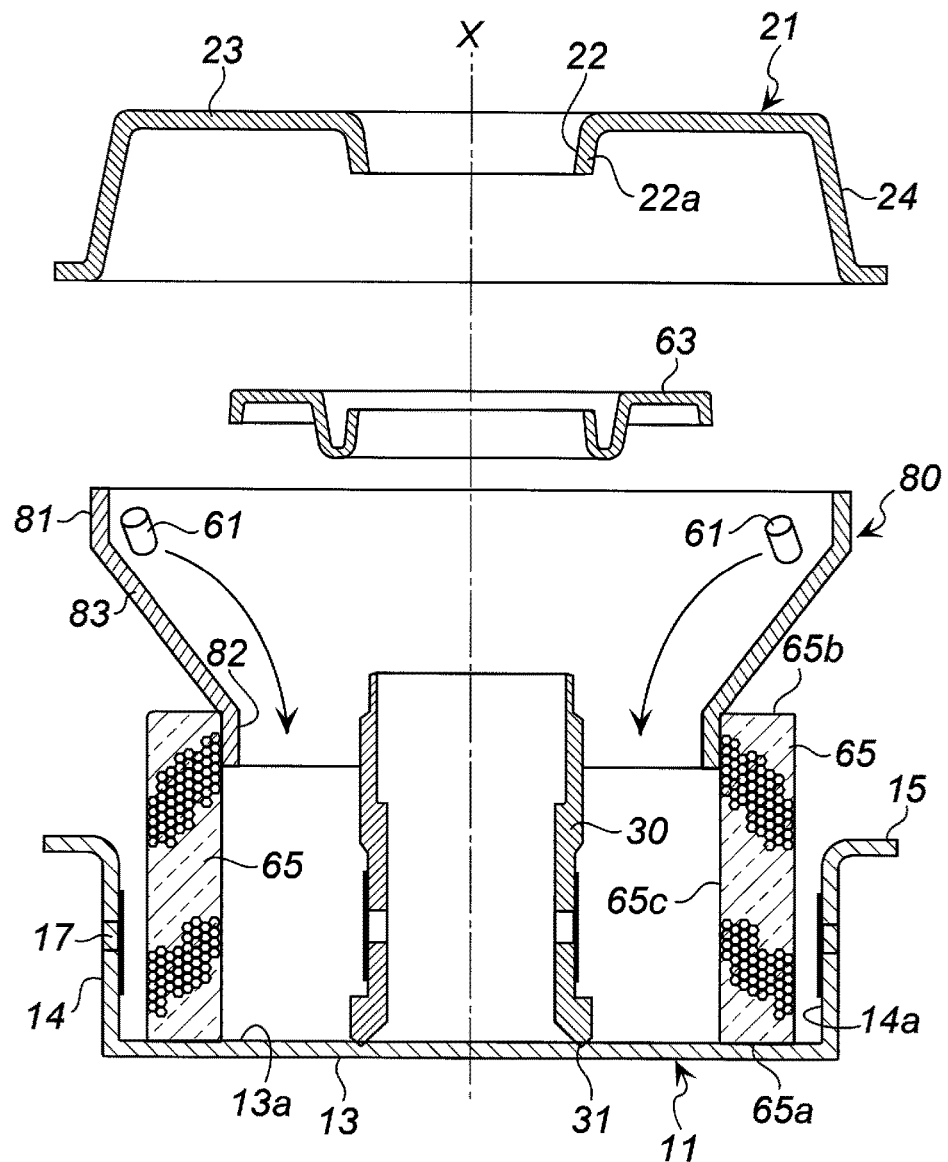

[Fig. 3]
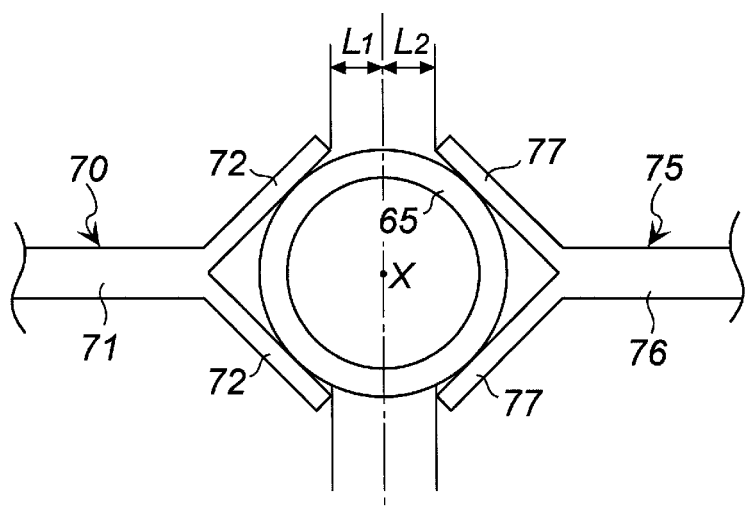

GAS GENERATOR AND ASSEMBLING METHOD THEREFOR

FIELD OF INVENTION

The present invention relates to a gas generator that is used in an airbag apparatus and to a method of assembling the gas generator.

DESCRIPTION OF RELATED ART

In pyrotechnic gas generators using a gas generating agent as a gas generation source, a cylindrical filter (a coolant/filter) for cooling and filtering a high-temperature combustion gas generated by combustion of the gas generating agent is used.

Since the filter is disposed at a distance from a circumferential wall surface of a housing where a gas discharge port is formed, a positioning device for the filter has to be provided inside the housing.

In a gas generator disclosed in JP-A No. H11-334517, a perforated basket 32 of a substantially porous cylindrical shape which is depicted in FIG. 1 functions as a positioning device for a coolant/filter 7.

In a gas generator disclosed in JP-A No. 2008-114773, a cylindrical coolant/filter 15 is positioned by a positioning portion 40 made of a convex portion formed at a top surface 13a of a diffuser shell 11 (a closure shell 11 in JP-A No. 2008-114773) where a gas discharge port 14 is present.

Conventionally, when a cylindrical filter is disposed inside a housing, a support member needs to be disposed or a positioning portion made of a convex portion needs to be framed on the top surface of a housing.

SUMMARY OF INVENTION

The present invention provides a gas generator including
a diffuser shell having a top portion, a circumferential wall portion extending from the peripheral portion of the top portion and a plurality of gas discharge ports which are provided in the circumferential wall portion and closed from the inside with a seal tape,
a closure shell having a bottom surface portion, which is provided with a mounting hole for mounting an igniter, and a circumferential wall portion extending from a peripheral portion of the bottom surface portion,
a housing obtained by combining and joining the respective openings of the diffuser shell and the closure shell,
in the housing,
an inner tube forming an ignition device chamber and being disposed such that an opening at a first end portion is abutted against the top portion of the diffuser shell and an opening at a second end encloses the igniter fitted in an opening in the bottom surface portion of the closure shell,
a cylindrical filter being disposed outside the inner tube at a distance from the gas discharge ports in the circumferential wall portion of the diffuser shell,
the inside of the inner tube corresponding to the ignition device chamber, a combustion chamber being defined between the inner tube and the cylindrical filter, the ignition device chamber and the combustion chamber being in communication with each other at a time of actuation through an enhancer hole formed in a circumferential wall portion of the inner tube,
in the combustion chamber, a molded article of a gas generating agent being fixed on the side of the top portion of the diffuser shell by an underplate which is fitted to the inner tube on the side of the closure shell but not abutted against the cylindrical filter,
before actuation, a central axis of the cylindrical filter and a central axis of the diffuser shell being positioned to coincide with each other by the presence of the molded article of the gas generating agent,
the diffuser shell having no convex portion or step portion for positioning the cylindrical filter, and
no member for positioning the cylindrical filter being disposed inside the housing.

The present invention provides a method of assembling the gas generator of the present invention, including steps of
fixing by welding the first end portion of the inner tube to the top portion of the diffuser shell such that the central axis of the diffuser shell and the central axis of the inner tube coincide with each other,
placing the diffuser shell, in which the inner tube is fixed by welding to the top portion in the previous step, on a table with the top portion side down,
accommodating the ignition device inside the inner tube,
disposing the cylindrical filter at a distance from the circumferential wall portion of the diffuser shell provided with the gas discharge ports, such that the central axis of the diffuser shell and the central axis of the cylindrical filter coincide with each other,
filling the inside of the combustion chamber with a predetermined amount of the molded article of the gas generating agent in a state in which an outside positioning jig is disposed between the cylindrical filter and the circumferential wall portion of the diffuser shell, and/or an inside positioning jig is disposed between the cylindrical filter and the inner tube,
removing the inside positioning jig and/or the outside positioning jig and then fitting the annular underplate to the inner tube to fix the molded article of the gas generating agent filled in the combustion chamber, and
overlaying the closure shell on the diffuser shell, joining the shells by welding at a contact portion, and joining by welding a contact portion of the closure shell and the inner tube on the side of the second end portion.

BRIEF DESCRIPTION OF THE DRAWINGS

The present invention will become more fully understood from the detailed description given hereinbelow and the accompanying drawings which are given by way of illustration only, and thus are no limitative of the present invention and wherein:

FIG. 1 shows a cross-sectional view in the X-axis direction of a gas generator of the present invention;

FIG. 2 shows an explanatory drawing of a method of assembling the gas generator depicted in FIG. 1, this drawing illustrating an embodiment in which an inside positioning jig is used; and FIG. 3 shows an explanatory drawing of a method of assembling the gas generator depicted in FIG. 1, this drawing illustrating an embodiment in which an outside positioning jig is used.

DETAILED DESCRIPTION OF INVENTION

The present invention provides a gas generator in which a cylindrical filter is positioned without disposing a support member inside a housing or forming a positioning portion at the housing. The present invention also provides a method of assembling the gas generator."

When a gas generator is assembled, a method is implemented by which the top portion of a diffuser shell provided with a gas discharge port is on the lower side.

Therefore, after a cylindrical filter is disposed at a predetermined position, the position is fixed in a state in which the top portion of the diffuser shell provided with the gas discharge port is on the lower side.

At present, since the assembling is performed in an automated production line, naturally, it is possible to dispose the cylindrical filter in the diffuser shell such that the central axis of the diffuser shell and the central axis of the cylindrical filter coincide with each other.

However, for example, the subsequent filling of the gas generating agent is performed with tapping, and presumably, the position of the cylindrical filter can shift in the operations of subsequent steps.

Therefore, conventionally, it is necessary to dispose a support member inside the housing or to foil a positioning portion at the housing.

The gas generator of the present invention differs from the conventional arts in that the diffuser shell used therein does not have a convex portion or a step portion for positioning the cylindrical filter and in that no member for positioning the cylindrical filter is disposed inside the housing.

With the method of assembling the gas generator of the present invention, either one or both of the outside positioning jig and the inside positioning jig are used in an assembling process, thereby making it possible to position the cylindrical filter at a predetermined position by filling the molded article of the gas generating agent.

In one embodiment of the method of assembling the gas generator of the present invention, the outside positioning jig can include a combination of two jigs, namely, a first outside positioning jig and a second outside positioning jig, the cylindrical filter can be fixed such that the central axis of the diffuser shell and the central axis of the cylindrical filter coincide with each other by abutting the first outside positioning jig and the second outside positioning jig against an outer circumferential surface of the cylindrical filter from two opposing directions, and the inside positioning jig can have a funnel shape including a larger-diameter circumferential wall portion, a smaller-diameter circumferential wall portion, and an annular inclined surface portion connecting the larger-diameter circumferential wall portion and the smaller-diameter circumferential wall portion, a boundary portion between the annular inclined surface portion and the smaller-diameter circumferential wall portion can abut against an open end surface of the cylindrical filter, and an outer circumferential surface of the smaller-diameter circumferential wall portion can abut against an inner circumferential surface of the cylindrical filter.

In the gas generator of the present invention, no convex portion or step portion needs to be formed for positioning the cylindrical filter at the diffuser shell, and also no support member is needed for positioning the cylindrical filter.

DESCRIPTION OF EMBODIMENTS (1) Gas Generator Depicted in FIG. 1

A gas generator 1 has a housing 2 including a diffuser shell 11 and a closure shell 21.

The diffuser shell 11 and the closure shell 21 are made of iron, stainless steel or the like.

The diffuser shell 11 has a top portion 13 and a circumferential wall portion 14 extending from the peripheral portion of the top portion 13, and a flange 15 is provided at an opening of the diffuser shell.

The diffuser shell 11 does not have, in the top portion 13, a convex portion, a step portion or an inclined surface portion (for example, an upper annular inclined surface 16 in FIG. 1 of JP-A No. 2008-114773) for positioning a cylindrical filter 65.

A plurality of gas discharge ports 17, which are closed from the inside with a seal tape 16 made of aluminum or the like, are famed in the circumferential wall portion 14.

The plurality of the gas discharge ports 17 are famed equidistantly in the circumferential direction.

The closure shell 21 has a bottom surface portion 23 having an igniter mounting hole 22 for mounting an igniter 50, and a circumferential wall portion 24 extending from the peripheral portion of the bottom surface portion 23, and a flange 25 is provided at an opening of the circumferential wall portion 24.

The igniter mounting hole 22 has a cylindrical portion 22a extending to the inside of the housing 2.

In the housing 2, the diffuser shell 11 and the closure shell 21 are combined at the flange 15 and the flange 25 at the respective openings and joined by welding in a welded portion 3.

An inner tube 30 is disposed inside the housing 2.

An opening of the inner tube 30 at a first end portion 31 abuts against an inner wall surface 13a of the top portion 13 of the diffuser shell.

The top portion 13 of the diffuser shell and the first end portion 31 are welded together at a contact portion.

The inner tube 30 is disposed such that an opening at a second end portion 32 encloses the igniter 50 fitted and fixed in the opening (the igniter mounting hole) 22 in the bottom surface portion 23 of the closure shell.

The igniter 50 is mounted such that the cylindrical portion 22a of the igniter mounting hole 22 and the outer wall surface of the inner tube 30 on the side of the second end portion 32 abut against each other and that the inner wall surface of the inner tube 30 on the side of the second end portion 32 and an igniter collar 51 of the igniter 50 abut against each other.

The igniter 50 is fixed by a step portion 34 of the inner circumferential wall of the inner tube 30 on the side of the second end portion 32 and a bent portion 33 of the opening at the second end portion 32.

The cylindrical portion 22a of the igniter mounting hole 22 and the outer wall surface of the inner tube 30 on the side of the second end portion 32 are welded together at a contact portion.

The inside of the inner tube 30 corresponds to an ignition device chamber 35, and a plurality of enhancer holes 37 are famed in a circumferential wall portion 36.

The plurality of the enhancer holes 37 are formed equidistantly in the circumferential direction and closed from the outside with a seal tape made of aluminum or the like.

An enhancer agent container 40 filled with an enhancer agent is accommodated inside the ignition device chamber 35.

A bottom surface 42 of the enhancer agent container 40 abuts against an ignition portion 52 of the igniter 50, and a top surface 43 thereof abuts against the top portion 13.

The space outside the inner tube 30 corresponds to a combustion chamber 60.

A cylindrical filter 65 is disposed such that a cylindrical space 66 is famed between the combustion chamber 60 and the respective circumferential wall portions 14 and 24 of the diffuser shell 11 and the closure shell 21.

In the cylindrical filter 65, a first end surface 65a is pressed against the top portion 13 of the diffuser shell, and a second end surface 65b is pressed against the bottom surface portion 23 of the closure shell.

The inside of the combustion chamber 60 (between the inner tube 30 and the cylindrical filter 65) is filled with a predetermined amount of a molded article of a gas generating agent 61.

The molded article of the gas generating agent 61 is fixed by an annular underplate 63 fitted to the inner tube 30, on the side of the closure shell 21.

The molded article of the gas generating agent 61 is fixed inside the combustion chamber 60, and thereby the cylindrical filter 65 is supported so as to be prevented from moving in the radial direction.

(2) Assembling Method of the Gas Generator Depicted in FIG. 1

The assembling method of the gas generator depicted in FIG. 1 will be explained with reference to FIG. 2.

The specific feature of the assembling method of the gas generator of the present invention is that a positioning jig for the cylindrical filter is used in a step of filling the molded article of the gas generating agent. Therefore, assembling steps other than the above step can be implemented similarly to the assembling steps of a conventional gas generator and are not limited to the below-described steps.

As mentioned hereinabove, the gas generator assembling line is completely automated.

In the initial step, the first end portion 31 of the inner tube is fixed by welding to the top portion 13 of the diffuser shell such that the central axis of the diffuser shell 11 and the central axis of the inner tube 30 coincide with each other (both axes are the X-axis in FIG. 1).

Then, after the inner tube 30 is fixed by welding to the top portion 13 in the previous step, the diffuser shell 11 is placed on an assembling table with the top portion 13 side down, and a seal tape is attached to each of the diffuser shell 11 and the inner tube 30.

Thereafter, the enhancer agent container 40 and the electric igniter 50 can be accommodated inside the inner tube 30, but they may be accommodated in the following step.

In the next step, the cylindrical filter 65 is disposed at a distance (the cylindrical space 66) from the circumferential wall portion 14 of the diffuser shell provided with the gas discharge ports 17, such that the central axis of the diffuser shell 11 and the central axis of the cylindrical filter 65 coincide with each other (both axes are the X-axis in FIG. 1).

In the next step, outside positioning jigs 70 and 75 and/or an inside positioning jig 80 is disposed.

FIG. 2 shows a state in which the inside positioning jig 80 is used, and FIG. 3 shows a state in which the outside positioning jigs (the combination of the first outside positioning jig 70 and the second outside positioning jig 75) are used.

The outside positioning jigs (the combination of the first outside positioning jig 70 and the second outside positioning jig 75) and the inside positioning jig 80 are arranged in a fixed position with respect to the abovementioned assembling table, and these jigs are used repeatedly.

The inside positioning jig 80 has a funnel shape including a larger-diameter circumferential wall portion 81, a smaller-diameter circumferential wall portion 82 and an annular inclined surface portion 83 connecting the larger-diameter circumferential wall portion 81 and the smaller-diameter circumferential wall portion 82.

The larger-diameter circumferential wall portion 81 and the smaller-diameter circumferential wall portion 82 are formed to be coaxial, and the annular inclined surface portion 83 is famed to reduce in inner diameter from the larger-diameter circumferential wall portion 81 to the smaller-diameter circumferential wall portion 82.

The inside positioning jig 80 is used in such a way that a boundary portion (a corner portion) between the annular inclined surface portion 83 and the smaller-diameter circumferential wall portion 82 is abutted against the second end surface 65b of the cylindrical filter 65 and the smaller-diameter circumferential wall portion 82 is inserted into the cylindrical filter 65.

A flat surface may be famed at the boundary portion between the annular inclined surface portion 83 and the smaller-diameter circumferential wall portion 82, and the flat surface may be abutted against the inner circumference of the second end surface 65b of the cylindrical filter 65.

The smaller-diameter circumferential wall portion 82 and an inner circumferential surface 65c of the cylindrical filter 65 may be abutted against each other or may be at a distance from each other.

The molded article of the gas generating agent 61 is charged into the combustion chamber 60, using the inside positioning jig 80. At this time, the charging is performed with tapping so as to eliminate gaps.

The outside positioning jig includes a combination of two jigs, namely, the first outside positioning jig 70 and the second outside positioning jig 75.

The first outside positioning jig 70 has a first arm portion 71 and a first support portion 72 branching from the first arm portion 71 in an Y-like fashion (or in a U-like fashion).

The second outside positioning jig 75 has a second arm portion 76 and a second support portion 77 branching from the second arm portion 76 in an Y-like fashion (or in a U-like fashion).

When the cylindrical filter 65 is fixed using the first outside positioning jig 70 and the second outside positioning jig 75, as depicted in FIG. 3, the cylindrical filter 65 is clamped from two opposing directions with the first support portion 72 of the first outside positioning jig 70 and the second support portion 77 of the second outside positioning jig 75, and the filter is fixed such that the central axis X of the diffuser shell 11 and the central axis X of the cylindrical filter 65 coincide with each other.

In order to make the central axes X coincide, the relative positions of the first outside positioning jig 70 and the second outside positioning jig 75 are adjusted such that a length L1 and a length L2 depicted in FIG. 3 match each other.

In the next step, after the charging of the molded article of the gas generating agent 61 is completed, the outside positioning jig (the combination of the first outside positioning jig 70 and the second outside positioning jig 75) and the inside positioning jig 80 are removed and then, the annular underplate 63 is fitted to the inner tube 30 to fix the molded article of the gas generating agent 61 charged in the combustion chamber 60.

The first outside positioning jig 70 and the second outside positioning jig 75 can be removed after fitting the annular underplate 63.

In the next step, the closure shell 21 is overlaid on the diffuser shell 11, and the shells are welded together at the contact portion (the welding portion 3 which is the contact portion of the flange 15 and the flange 25).

In the case that the enhancer agent container 40 and the electric igniter 50 are not yet accommodated in the inner tube 30 in the previous step, they are accommodated before the closure shell 21 is overlaid.

The contact portion of the cylindrical portion 22a of the closure shell 21 and the second end portion 32 of the inner tube is then welded.

Where the assembling method of the present invention is implemented, it is not necessary to form a convex portion or a step portion for positioning the cylindrical filter 65 in the diffuser shell 11, and no support member is needed for positioning the cylindrical filter 65.

Thus, since no special processing of the diffuser shell 11 is required and no support member is required, the cost of parts is reduced and the assembling time is shortened.

The operation of the gas generator 1 depicted in FIG. 1 will be explained hereinbelow.

Before the actuation, the cylindrical filter 65 is fixed by the molded article of the gas generating agent 61 fixed inside the combustion chamber 60.

When the igniter 50 is actuated and flame or the like is generated from the ignition portion 52, the bottom surface 42 of the enhancer agent container 40 is broken and the enhancer agent in the container is ignited and burned.

The flame generated from the enhancer agent is jetted out from the enhancer hole 37 into the combustion chamber 60, the molded article of the gas generating agent 61 are ignited and burned to produce a combustion gas.

The combustion gas passes through the cylindrical filter 65 and flows into the cylindrical space 66. The seal tape 16 is then broken by pressure rise and the gas is discharged into the airbag through the plurality of the opened gas discharge ports 17.

The present invention thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A method of assembling the gas generator according including steps of
    fixing by welding a first end portion of an inner tube to a top portion of a diffuser shell such that the central axis of the diffuser shell and a central axis of the inner tube coincide with each other,
    placing the diffuser shell, in which the inner tube is fixed by welding to the top portion in the previous step, on a table with the top portion side down,
    accommodating an ignition device inside the inner tube,
    disposing a cylindrical filter at a distance from the circumferential wall portion of the diffuser shell provided with gas discharge ports, such that the central axis of the diffuser shell and a central axis of the cylindrical filter coincide with each other,
    filling a combustion chamber with a predetermined amount of a molded article of a gas generating agent in a state in which an outside positioning jig is disposed between the cylindrical filter and a circumferential wall portion of the diffuser shell, and/or an inside positioning jig is disposed between the cylindrical filter and the inner tube,
    removing the inside positioning jig and/or an outside positioning jig and then fitting an annular underplate to the inner tube to fix the molded article of the gas generating agent filled in the combustion chamber, and
    overlaying a closure shell on the diffuser shell, joining the shells by welding at a contact portion, and joining by welding a contact portion of the closure shell and the inner tube on the side of a second end portion.

2. The method of assembling the gas generator according to claim 1 wherein
    the outside positioning jig includes a combination of two jigs, namely, a first outside positioning jig and a second outside positioning jig,
    the cylindrical filter is fixed such that the central axis of the diffuser shell and the central axis of the cylindrical filter coincide with each other by abutting the first outside positioning jig and the second outside positioning jig against an outer circumferential surface of the cylindrical filter from two opposing directions, and
    the inside positioning jig has a funnel shape including a larger-diameter circumferential wall portion, a smaller-diameter circumferential wall portion, and an annular inclined surface portion connecting the larger-diameter circumferential wall portion and the smaller-diameter circumferential wall portion, a boundary portion between the annular inclined surface portion and the smaller-diameter circumferential wall portion abuts against an open end surface of the cylindrical filter, and an outer circumferential surface of the smaller-diameter circumferential wall portion abuts against an inner circumferential surface of the cylindrical filter.

* * * * *